(12) United States Patent
Chang

(10) Patent No.: US 9,686,504 B2
(45) Date of Patent: *Jun. 20, 2017

(54) REMOTE RESOURCE ACCESS INTERFACE APPARATUS

(71) Applicant: Gil Hoon Chang, Seoul (KR)

(72) Inventor: Gil Hoon Chang, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,286

(22) Filed: Oct. 27, 2015

(65) Prior Publication Data

US 2016/0050388 A1    Feb. 18, 2016

Related U.S. Application Data

(63) Continuation of application No. 14/572,181, filed on Dec. 16, 2014, now Pat. No. 9,179,093, which is a
(Continued)

(51) Int. Cl.
*H04N 7/01* (2006.01)
*G06F 1/16* (2006.01)
(Continued)

(52) U.S. Cl.
CPC ......... *H04N 7/0117* (2013.01); *G06F 1/1632* (2013.01); *G06F 3/0488* (2013.01); *G06F 3/04886* (2013.01); *H04N 5/4403* (2013.01); *H04N 21/4122* (2013.01); *H04N 21/41407* (2013.01); *H04N 21/43637* (2013.01); *H04N 21/4402* (2013.01); *H04N 21/4621* (2013.01); *H04N 21/4222* (2013.01); *H04N 21/42207* (2013.01); *H04N 21/42209* (2013.01); *H04N 21/42214* (2013.01); *H04N 21/42224* (2013.01); *H04N 2005/4408* (2013.01);
(Continued)

(58) Field of Classification Search
CPC ...... H04N 5/44; H04N 5/4403; H04N 7/0117; H04N 2005/4408; H04N 2005/4417; H04N 2005/4425; H04H 40/00
USPC ..... 375/240.21; 348/734, 445; 345/169, 168
See application file for complete search history.

(56) References Cited

U.S. PATENT DOCUMENTS

| 6,594,727 | B1 | 7/2003 | Tanaka |
| 7,155,544 | B2* | 12/2006 | Im .......................... G06F 1/1626 710/62 |
| 8,320,461 | B2 | 11/2012 | Chang |
| 8,942,291 | B2 | 1/2015 | Chang |
| 9,179,093 | B2 | 11/2015 | Chang |

(Continued)

*Primary Examiner* — Jamal Javaid
(74) *Attorney, Agent, or Firm* — Alston & Bird LLP

(57) ABSTRACT

A remote resource access interface apparatus is provided. A key input unit has keys for generating input key values. A communication unit transmits a connection establishment request message including screen resolution information to, and receives a connection establishment response message including supportable key information from, a portable device. The communication unit transmits input key information to and receives video information from the portable device after establishing the connection. A pixel information processing unit converts the video information to pixel signals for a video output unit to display as a visual image. A key advisor unit extracts supportable key information from the response message and outputs the supportable key information to the video output unit. The video information is video data adjusted in resolution based on the screen resolution information, and the input key value is mapped to one of key values indicated by the key information of the portable device.

9 Claims, 5 Drawing Sheets

Related U.S. Application Data continuation of application No. 13/659,241, filed on Oct. 24, 2012, now Pat. No. 8,942,291, which is a continuation of application No. 12/034,154, filed on Feb. 20, 2008, now Pat. No. 8,320,461.

(51) Int. Cl.
*G06F 3/0488* (2013.01)
*H04N 5/44* (2011.01)
*H04N 21/41* (2011.01)
*H04N 21/414* (2011.01)
*H04N 21/4363* (2011.01)
*H04N 21/4402* (2011.01)
*H04N 21/462* (2011.01)
*H04N 21/422* (2011.01)

(52) U.S. Cl.
CPC ........... *H04N 2005/4416* (2013.01); *H04N 2005/4417* (2013.01); *H04N 2005/4425* (2013.01)

(56) References Cited

U.S. PATENT DOCUMENTS

| | | |
|---|---|---|
| 2003/0063717 A1 | 4/2003 | Holmes |
| 2004/0255034 A1 | 12/2004 | Choi |
| 2007/0216654 A1* | 9/2007 | Arnold .............. G06F 17/30899 345/169 |
| 2008/0125202 A1 | 5/2008 | Kamiyama et al. |
| 2008/0248829 A1 | 10/2008 | Zilca et al. |
| 2008/0320500 A1* | 12/2008 | Li ........................... G06F 3/038 719/324 |

* cited by examiner

REMOTE RESOURCE ACCESS INTERFACE APPARATUS

CROSS-REFERENCE TO RELATED APPLICATIONS

This application is a continuation of U.S. application Ser. No. 14/572,181, filed Dec. 16, 2014, which is a continuation of U.S. application Ser. No. 13/659,241, filed Oct. 24, 2012, which is a continuation of U.S. application Ser. No. 12/034,154, filed Feb. 20, 2008, each of which is hereby incorporated in its entirety by reference.

BACKGROUND OF THE INVENTION

Field of the Invention

The present invention relates to a portable device and, in particular, to a remote resource access interface apparatus for a portable device.

Description of the Related Art

Recently, most people carry one or more portable electronic devices such as laptop computer, Personal Digital Assistant (PDA), and cellular phone, and such devices are basically provided with communication functions. With the advance of communication technologies and recent tendency toward functional convergence, the portable devices are evolving to multifunctional devices. For example, recent mobile phones support various functions such as short message service (SMS), internet access, game, e-book, and the like. This means that a mobile phone is used for accessing the Internet as with a personal computer (PC), and a PDA can be used as a communication device.

In the meantime, the portable devices are becoming slim and compact in their designs while maintaining tight integration and full functionality of the components, whereby display screen and keypad are becoming smaller in size, resulting in manipulation inconvenience. Also, since the portable devices are provided with their respectively integrated input/output (IO) modules, their portability and usability are limited by redundant IO modules. Furthermore, overlapped functionality of the portable devices, caused by similar hardware and software components, are not integrally managed, resulting in waste of resources.

SUMMARY OF THE INVENTION

The present invention has been made in an effort to solve the above problems, and it is an object of the present invention to provide a remote resource access interface apparatus that is capable of outputting video and audio signals of a portable device through external devices such as external display panel and speaker system and receiving signals input through an external input device, thereby improving extendibility and portability of a portable device.

In accordance with an aspect of the present invention, the above and other objects are accomplished by a remote resource access interface apparatus. The remote resource access interface apparatus includes a key input unit having a plurality of keys for generating input key values; a communication unit for transmitting a connection establishment request message including screen resolution information to a portable device and receiving a connection establishment response message including supportable key information from the portable device, the communication unit transmitting input key information to and receiving video information from the portable device after establishing the connection; a video output unit for displaying the video information in the form of a visual image; a pixel information processing unit for converting the video information to pixel signals appropriate for the video output unit; and a key advisor unit for extracting supportable key information from the connection establishment response message and outputting the supportable key information to the video output unit, wherein the video information is video data adjusted in resolution on the basis of the screen resolution information, and the input key value is mapped to one of key values indicated by the key information of the portable device.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
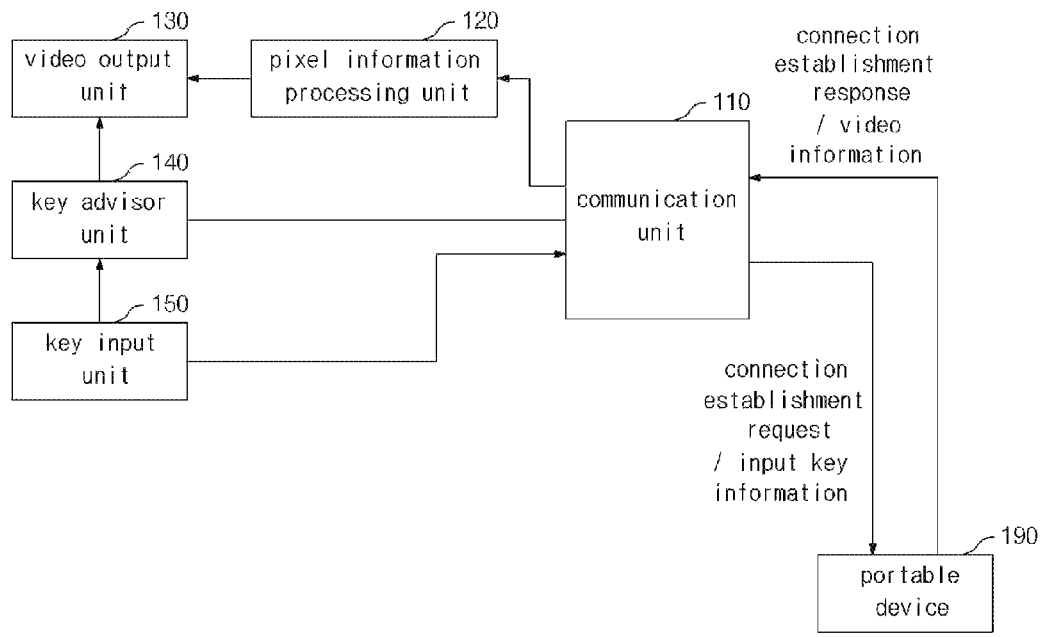
FIG. 1 is a block diagram illustrating a remote resource access interface apparatus according to an exemplary embodiment of the present invention.

FIG. 1 is a block diagram illustrating a remote resource access interface apparatus according to an exemplary embodiment of the present invention.

Referring to FIG. 1, the interface apparatus includes a communication unit 110 connected to a portable device 190, a pixel information processing unit 120, a video output unit 130, a key advisor unit 140, and a key input unit 150.

The communication unit 110 transmits a connection establishment request signal to the portable device 190. The connection establishment request signal includes information on the resolutions supported by the video output unit 130. Here, the portable device 190 is an electronic device having a small display screen, such as a mobile phone, PDA, etc.

The connection establishment request signal may include information on the type of input/output (IO) device of the remote resource access interface apparatus. The IO device can be a keypad-type device or a gaming consol-type device.

The communication unit 110 receives a connection establishment response signal from the portable device 190. The connection establishment response signal includes information of function keys supported by the portable device 190. The communication establishment response signal is received, the communication unit 110 transmits an input key information to the portable device 190 and receives screen information from the portable device 190. The screen information is of a resolution adjusted on the basis of the resolution received from the portable device 190. That is, the screen information received from the portable device 190 is pixel information corresponding to the screen resolution according to a specification of the video output unit 130.

The pixel information processing unit 120 converts the video information received from the communication unit 110 to an electrical signal appropriate for a display panel and a panel driving circuit. That is, the pixel information processing unit 120 is provided with a graphical interface circuit for the video output unit 130.

The video output unit 130 displays the video information output by the pixel information processing unit 120. The video output unit 130 can be implemented with a liquid crystal display (LCD) panel or an organic light emitting diode (OLED) display panel.

The key adviser unit 140 extracts supportable key information from the connection establishment response signal and transmits the supportable key information to the video output unit 130 so as to be displayed on the screen.

The key input unit 150 is provided with a plurality of keys for generating input key commands. The input key commands are generated by matching the key values input through the key input unit 150 to the key values of the portable device 190 with reference to the supportable key information.

The portable device 190 extracts display resolution information of the video output unit 130 from the connection establishment request signal and transmits video information of which resolution is adjusted on the basis of the screen resolution information. For example, the portable device 190 processes the video information or the pixel information to fit for the specification of the video output unit 130 by means of firmware or preinstalled software.

The portable device 190 extracts the device type information from the connection establishment request signal and resets the user interface menu thereof on the basis of the device type information.

In a case that a keypad-type IO device is connected to the portable device 190, the user interface menu of the portable device may be reconfigured such that a text composition functionality associated with an e-mail or document has the priority.

In a case that a game consol is connected to the portable device 190, the user interface menu of the portable device may be reconfigured such that a gaming menu has the priority.

Figure 2A:
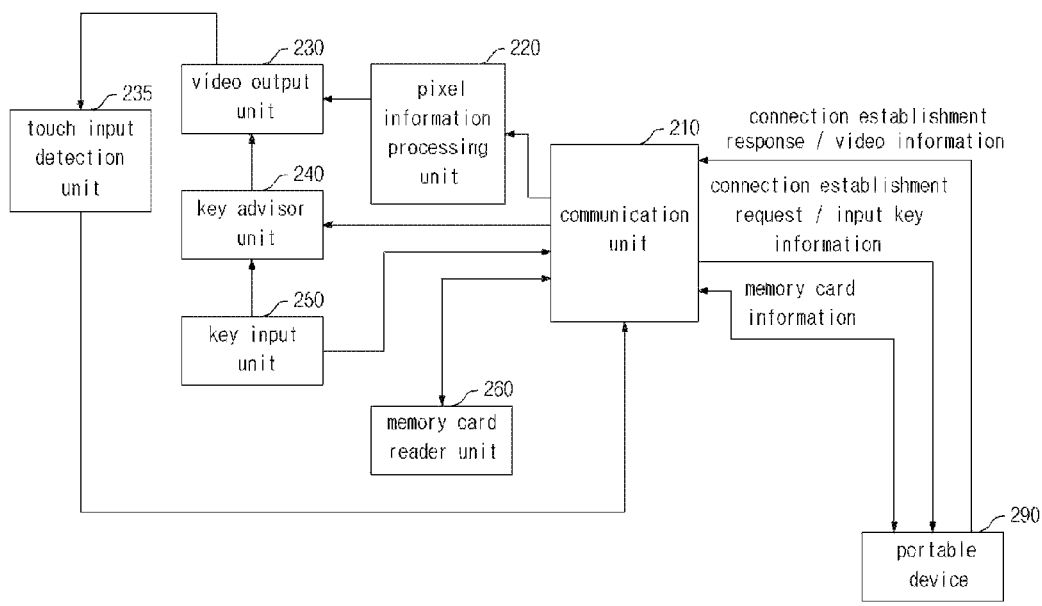
FIG. 2a is a block diagram illustrating a remote resource access interface apparatus according to another exemplary embodiment of the present invention.

FIG. 2*a* is a block diagram illustrating a remote resource access interface apparatus according to another exemplary embodiment of the present invention.

Referring to FIG. 2*a*, the interface apparatus includes a communication unit 210 connected to a portable device 290, a pixel information processing unit 220, a video output unit 230, a touch input detection unit 235, a key advisor unit 240, a key input unit 250, and a memory card reader unit 260.

The communication unit 210 transmits a connection establishment request signal to the portable device 290. The connection establishment request signal includes information on the screen resolutions supported by the video output unit 230. Here, the portable device 290 is an electronic device having a small display screen, such as a mobile phone, PDA, etc.

The communication unit 210 received a connection establishment response signal from the portable device in response to the connection establishment request signal. The connection establishment response signal includes compatibility information for informing of compatible connection features. If the connection establishment response signal is received, the communication unit 210 transmits key input information to the portable device 290 and prepares to receive video information from the portable device 290. At this time, the portable device 290 adjusts the video information on the basis of the compatibility information such that video information adjusted to fit for the resolution of the video output unit 230 is transmitted.

The communication unit 210 can be provided with at least one of wireless communication interfaces specified by Bluetooth, wireless fidelity (wi-fi), ZigBee, wireless broadband (WiBro) protocols for communicating with the portable device 290. The communication unit 210 also can be connected to the portable device 290 through a communication wire so as to exchange data with the portable device 290 in series or in parallel.

Preferably, the communication unit 210 is provided with a digital signal processor (DSP) to perform encoding and decoding on the signals to be transmitted and received and a communication interface for connecting the portable device 290 to an external auxiliary storage device or memory card reader unit 260 for extending storage capability of the portable device 290.

The pixel information processing unit 220 converts the video information received through the communication unit 210 to an electrical signal appropriate for a display panel and panel driving circuit of the video output unit 230. That is, the pixel information processing unit 220 is provided with a graphic interface circuit for the video output unit 220.

The video output unit 230 outputs the video information received from the pixel information processing unit 220 in the form of a visual image. The video output unit 230 can be implemented with a liquid crystal display (LCD) panel or an organic light emitting diode (OLED) panel. Preferably, the video output unit 230 is provided with a display screen larger than that of the portable device 290.

The touch input detection unit 235 detects a touch input on the display screen and generates position information on the display screen in association of the current image. The touch input detection unit 235 transmits the position information associated with the current image to the portable device 290.

The touch input detection unit 235 is implemented in the form of a touch-sensitive touchscreen covering the display screen of the video output unit 230. The tough input detection unit 235 may further include a processor for converting a pressure and voltage sensed on the display screen to the position information.

The key advisor unit 240 extracts compatible key information from the connection establishment response signal and displays the compatible key information on the display screen of the video output unit 230. The key advisor unit 240 displays a key among the keys provided by the compatible key information, which is matched to the key input through the key input unit 250, on the display screen of the video output unit 230.

If a set of keys are selected by through the key input unit 250, the key advisor unit 240 displays the keys supported by the portable device 290 on the display screen of the video output unit 230. If a key is input through the key input unit 250, the key advisor unit 240 matches the key value of the input key to a key value of the corresponding key supported by the portable device 290.

The key input unit 250 is provided with a plurality of keys for generating input key values.

The memory card reader unit 260 is provided with at least one slot for receiving an external memory card. The memory card reader unit 260 can read from and write to the external memory card. If an access command for specific information stored in the external memory card is received from the portable device 290, the memory card reader unit 260 reads the information indicated by the access command from the external memory card and transmits the read information to the portable device 290. On the other hand, if specific information is received from the portable device 290 together with a write command, the memory card reader unit 260 writes the information within the external memory unit. The memory card can be any of Secure Digital (SD) card, Memory Stick (MS), and Compact Flash (CF).

The remote resource access interface according to an embodiment of the present invention can be provided with a microphone and a speaker so as to input and output sound information to and from the portable device 290.

Figure 2B:
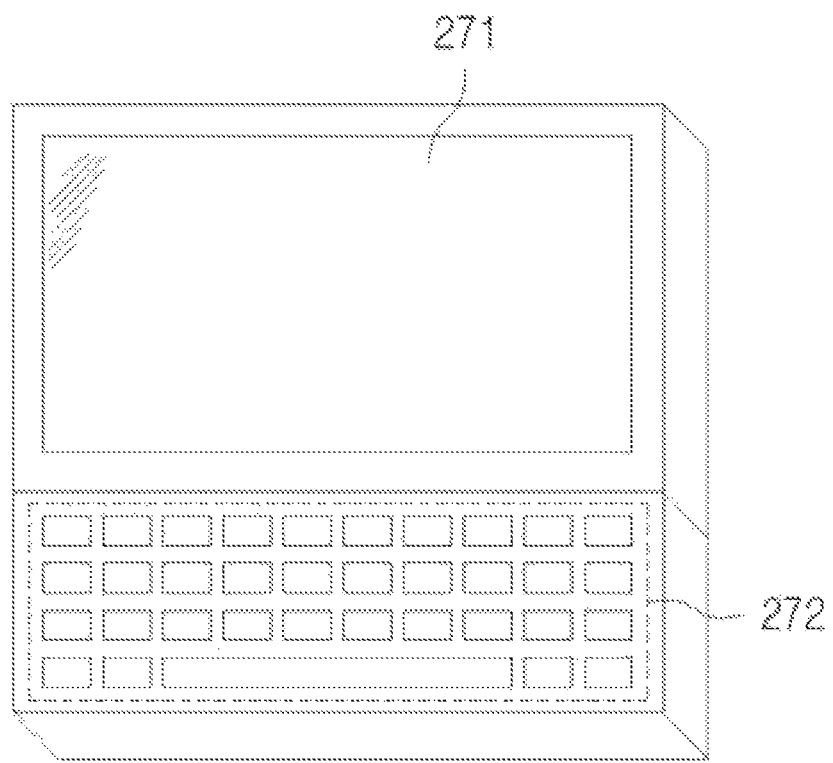
FIGS. 2b to 2d are exemplary views illustrating remote resource access interface apparatus according to exemplary embodiments of the present invention.
Figure 2C:
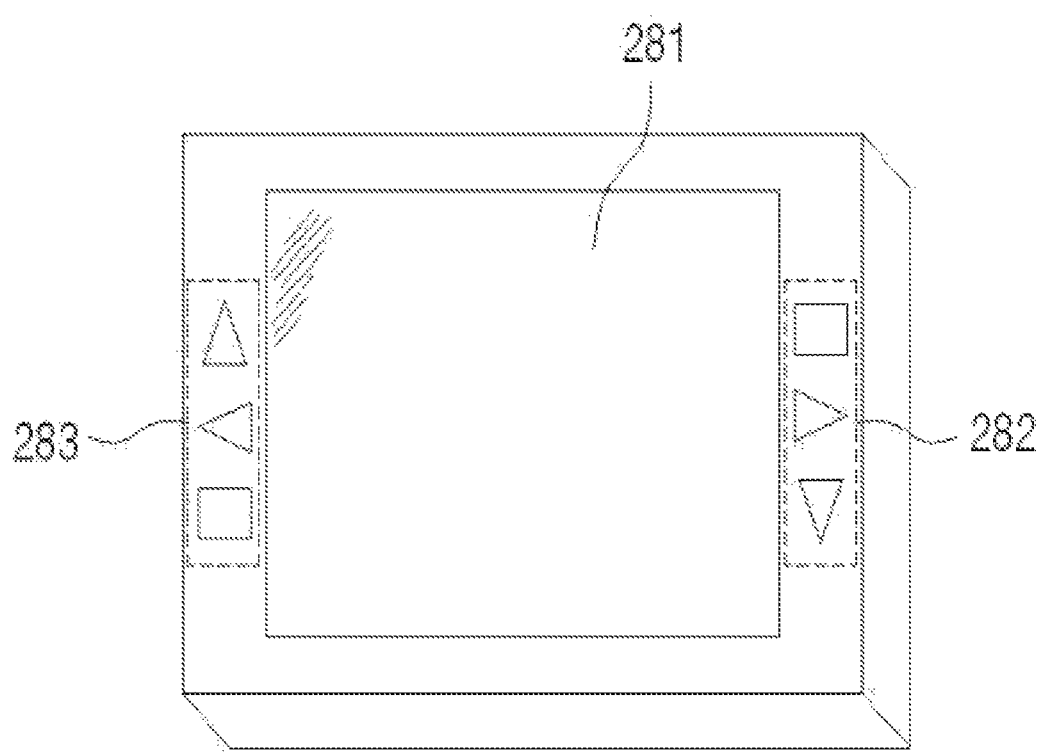
Figure 2D:
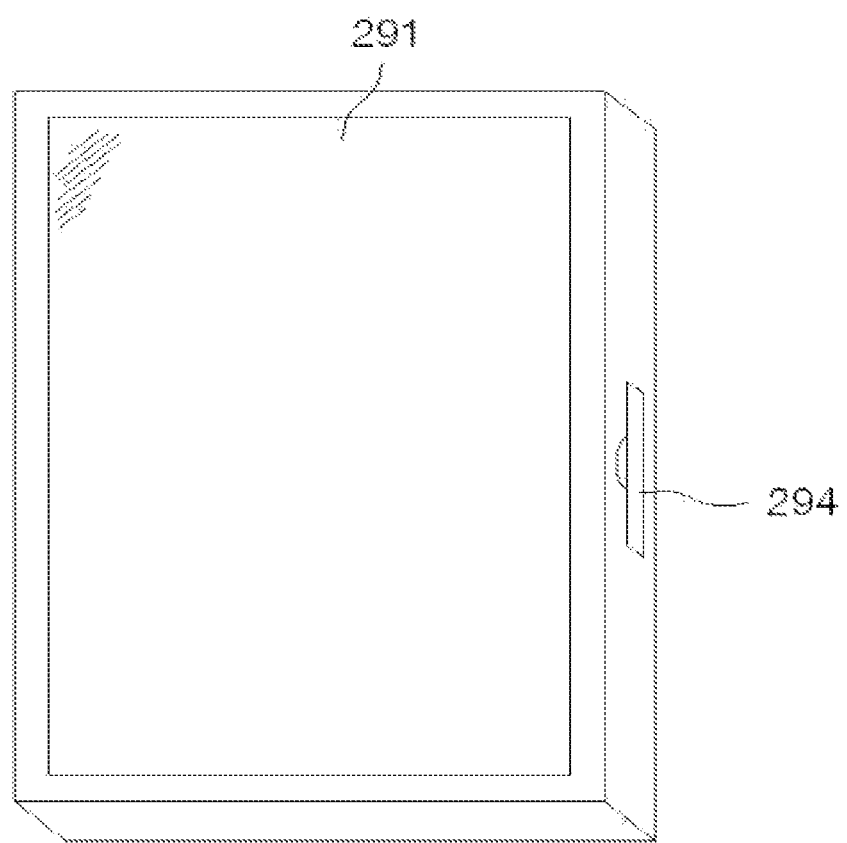

FIGS. 2b to 2d are exemplary views illustrating remote resource access interface apparatus according to exemplary embodiments of the present invention.

The apparatus of FIG. 2b is provided with a key input unit 272 having a plurality of alphanumeric keys and a video output unit 271 having relatively large screen. Due to the large display screen, this type of remote resource access interface apparatus is useful for text-based applications such as electronic mail (e-mail) reader, electronic dictionary, scheduler, etc.

The apparatus of FIG. 2c is provided with a key input unit 282 and 283 having simplified functional keys characterized for gaming and internet surfing. Particularly, this type of apparatus can be appropriate for implementing as a navigator integrated with a hands free functionality by connecting to audio system of a vehicle by means of an auto connection kit.

The apparatus of FIG. 2d is provided with a large display screen as of an input/output (IO) unit of a desktop PC so as to be useful for executing data and programs and local area communication. This apparatus is also provided with a memory card reader 294 which allows data backup and expansion of storage capability of the portable device.

Although the remote resource access interface apparatus is exemplary proposed in specific contour as depicted in FIGS. 2b to 2d, it is obvious to those skilled in the art that the remote resource access interface apparatus of the present invention can be implemented in various configurations.

Figure 3:
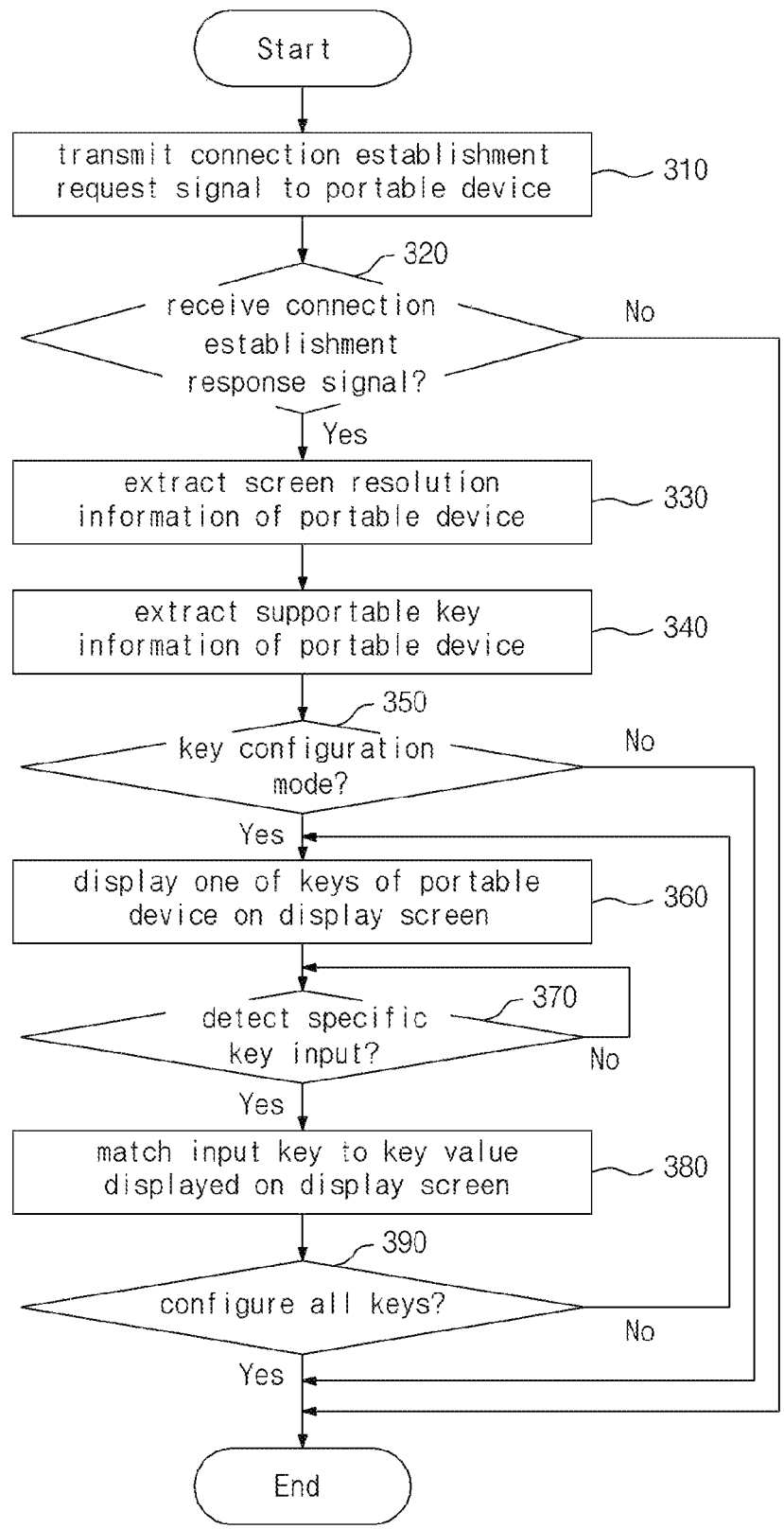
FIG. 3 is a flowchart illustrating a remote resource access interface method according to an exemplary embodiment of the present invention.

FIG. 3 is a flowchart illustrating a remote resource access interface method according to an exemplary embodiment of the present invention.

In FIG. 3, it is assumed that a portable device provides a remote resource access interface apparatus of FIG. 1 with screen resolution information.

Referring to FIG. 3, after establishing a communication channel with a portable device, the remoter resource access interface device transmits a connection establishment request message to the portable device at step S310.

Upon receiving the connection establishment request message is received, the portable device checks a compatibility of the remote resource access interface device and transmits, if the remote resource access interface device is compatible, a connection establishment response message to the remote resource access interface device.

The remote resource access interface device determines whether a connection establishment response message is received from the portable device at step S320.

If a connection establishment response message is received, the remote resource access interface apparatus extracts supportable screen resolution and key information from the connection establishment response message at steps S330 and S340.

Next, the remote resource access interface apparatus determines whether a key configuration mode is activated at step S350 and selects and displays, if the key configuration mode is activated, one of keys supported by the portable device at step S360. For example, if the selected key is a dial key, the remote resource access interface apparatus displays the dial key on its display screen.

Next, the remote resource access interface apparatus determines whether a specific key is input while displaying the selected key at step S379 and matches, if a specific key is input, the key value of the input key to the key value of the selected key at step S380.

Next, the remote resource access interface apparatus determines whether a key configuration termination command is input at step S390. If no key configuration termination command is input, the remote resource access interface apparatus repeats steps S360 to S380. If a key configuration termination command is input, the remote resource access interface apparatus ends the key configuration procedure and transmits, if a key input is detected, a value corresponding to the key input to the portable device.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the remote resource access interface apparatus of the present invention is provided as an independent input/output device attachable to individual portable devices, whereby the remote resource access interface apparatus improves the portability of multiple portable devices and reduces waste of resources by removing redundant components in both hardware and software. Also, the remote resource access interface apparatus can effectively provide multifunctional interface for portable multimedia devices.

What is claimed is:

1. A remote resource access interface apparatus comprising:
    a key input unit configured to generate input key values;
    a communication unit configured to receive supportable key information from a compatible portable device, the communication unit further configured to transmit input key information to the portable device and to receive video information from the portable device;
    a video output unit configured to display adjusted video information in the form of a visual image, the video output unit having a display screen having a screen specification different from a screen specification of the portable device, wherein the screen specification includes screen resolution information regarding the screen resolutions supported by the portable device; and
    a key advisor unit configured to extract the supportable key information from a response message;
    wherein the video output unit displays on the display screen, if a key configuration mode of the key advisor unit is activated, one or more keys of the portable device,
    wherein the key advisor unit is configured to receive corresponding keys through the key input unit, and
    wherein the adjusted video information is video data adjusted to screen resolution supported by the video output unit on the basis of the screen resolution information supported by the portable device, and the input key value is mapped to one of key values indicated by the supportable key information of the portable device such that key values corresponding to the keys of the key input unit match key values of the portable device.

2. A remote resource access interface apparatus comprising:
a touch input detection unit configured to detect touch input on a display screen and to generate touch position information on a display screen;
a communication unit configured to receive supportable key information from a compatible portable device, the communication unit further configured to transmit input key information to the portable device and to receive video information from the portable device;
a video output unit configured to display adjusted video information in the form of a visual image, the video output unit having a display screen having a screen specification different from a screen specification of the portable device, wherein the screen specification includes screen resolution information regarding the screen resolutions supported by the portable device; and
a key advisor unit configured to output the supportable key information to the video output unit wherein the key advisor unit is configured to receive the touch position information through the touch input detection unit, and
wherein the adjusted video information is video data adjusted to screen resolution supported by the video output unit on the basis of the screen resolution information supported by the portable device, and the touch position information is mapped to one of key values indicated by the supportable key information of the portable device such that the touch position information matches key values of the portable device.

3. A remote resource access interface apparatus comprising:
a key input configured to generate touch position information;
a communication unit configured to transmit screen resolution information of the remote resource access interface apparatus to a compatible portable device, the communication unit further configured to transmit the touch position information to the portable device and to receive video information from the portable device; and
a video output unit configured to display adjusted video information in the form of a visual image, the video output unit having a screen specification different from a screen specification of the portable device, wherein the screen specification includes screen resolution information regarding screen resolutions supported by the video output unit,
wherein the portable device displays on a display screen, if a key configuration mode is activated, one or more keys of the portable device and is configured to receive-the touch position information from the communication unit, and
wherein the adjusted video information is video data adjusted in resolution for the video output unit on the basis of the screen resolution information, and the touch position information is mapped to one of key values indicated by the supportable key information of the portable device such that the touch position information matches key values of the portable device.

4. A remote resource access interface system comprising:
a remote resource access interface apparatus; and a portable device,
wherein the remote resource access interface apparatus comprises:
a key input configured to generate touch position information;
a communication unit configured to transmit screen resolution information of the remote resource access interface apparatus to a compatible portable device, the communication unit further configured to transmit the touch position information to the portable device and to receive video information from the portable device; and
a video output unit configured to display adjusted video information in the form of a visual image, the video output unit having a screen specification different from a screen specification of the portable device, wherein the screen specification includes screen resolution information regarding screen resolutions supported by the video output unit,
wherein the portable device displays on a display screen, if a key configuration mode is activated, one or more keys of the portable device and is configured to receive-the touch position information from the communication unit, and
wherein the adjusted video information is video data adjusted in resolution for the video output unit on the basis of the screen resolution information, and the touch position information is mapped to one of key values indicated by the supportable key information of the portable device such that the touch position information matches key values of the portable device.

5. A remote resource access interface system for use with a portable device, the system comprising a remote resource access interface apparatus that comprises:
a key input configured to generate touch position information;
a communication unit configured to transmit screen resolution information of the remote resource access interface apparatus to a compatible portable device, the communication unit further configured to transmit the touch position information to the portable device and to receive video information from the portable device; and
a video output unit configured to display adjusted video information in the form of a visual image, the video output unit having a screen specification different from a screen specification of the portable device, wherein the screen specification includes screen resolution information regarding screen resolutions supported by the video output unit,
wherein the communication unit transmits the touch position information to the portable device that displays on a display screen, if a key configuration mode is activated, one or more keys of the portable device, and
wherein the adjusted video information is video data adjusted in resolution for the video output unit on the basis of the screen resolution information, and the touch position information is mapped to one of key values indicated by the supportable key information of the portable device such that the touch position information matches key values of the portable device.

6. A remote resource access interface system comprising:
a remote resource access interface apparatus; and a portable device, wherein the remote resource access interface apparatus comprises:
a key input unit configured to generate input key values;
a communication unit configured to transmit screen resolution information to a compatible portable device, the communication unit further configured to transmit input key information and to receive video information from the portable device; and a video output unit configured to display the video information in the form of a visual image, the video output unit having a display screen having a screen specification different from a screen specification of the portable device, wherein the screen resolution information includes information regarding the screen resolutions supported by the video output unit, wherein the portable device configured to output the supportable key information, wherein the portable device displays on a display screen, if a key configuration mode is activated, one or more keys of the portable device and is configured to receive corresponding keys through the key input unit, and wherein key values corresponding to the keys of the key input unit match key values of the portable device, and wherein the video information is video data adjusted in resolution by the portable device for the video output unit on the basis of the screen resolution information, and the input key value is mapped to one of key values indicated by the supportable key information of the portable device.

7. A remote resource access interface system for use with a portable device that can output a supportable key information, the system comprising a remote resource access interface apparatus that comprises:

a key input unit configured to generate input key values;

a communication unit configured to transmit screen resolution information to a compatible portable device, the communication unit further configured to transmit input key information and to receive video information from the portable device; and a video output unit configured to display the video information in the form of a visual image, the video output unit having a display screen having a screen specification different from a screen specification of the portable device, wherein the screen resolution information includes information regarding the screen resolutions supported by the video output unit, wherein the communication unit transmits corresponding keys to the portable device so that the portable device displays on a display screen, if a key configuration mode is activated, one or more keys of the portable device, and wherein the video information is video data adjusted in resolution by the portable device for the video output unit on the basis of the screen resolution information, and the input key value is mapped to one of key values indicated by the supportable key information of the portable device.

8. A remote resource access interface method comprising:
generating input key values using a key input unit;

receiving supportable key information from a compatible portable device using a communication unit, and transmitting input key information and receiving video information from the portable device using the communication unit;

displaying adjusted video information in the form of a visual image using a video output unit, the video output unit having a display screen having a screen specification different from a screen specification of the portable device, wherein the screen specification includes screen resolution information regarding the screen resolutions supported by the portable device; and extracting the supportable key information from a response message;

wherein one or more keys of the portable device are displayed on a display screen of the video output unit if a key configuration mode is activated, and corresponding keys are input through the key input unit, and wherein the adjusted video information is video data adjusted to screen resolution supported by the video output unit on the basis of the screen resolution information supported by the portable device, and the input key value is mapped to one of key values indicated by the supportable key information of the portable device such that key values corresponding to the keys of the key input unit match key values of the portable device.

9. A remote resource access interface method comprising:
generating touch position information using a key input unit;

transmitting screen resolution information to a compatible portable device using a communication unit, and transmitting touch position information and receiving video information from the portable device using the communication unit; and displaying adjusted video information in the form of a visual image using a video output unit, the video output unit having a display screen having a screen specification different from a screen specification of the portable device, wherein the screen resolution information includes information regarding the screen resolutions supported by the video output unit, if a key configuration mode is activated, displaying one or more keys of the portable device and receiving the touch position information from the communication unit, and wherein the adjusted video information is video data adjusted in resolution by the portable device for the video output unit on the basis of the screen resolution information, and the touch position information is mapped to one of key values indicated by the supportable key information of the portable device such that the touch position information match key values of the portable device.

* * * * *